UNITED STATES PATENT OFFICE 2,632,759

N-10 FORMYL FOLIC ACID AND PROCESS OF PREPARING THE SAME

Edward A. Kaczka, Elizabeth, and Karl Folkers, Plainfield, N. J., assignors to Merck & Co., Inc., Rahway, N. J., a corporation of New Jersey No Drawing. Application December 23, 1948, Serial No. 67,074

4 Claims. (Cl. 260—251.5)

This invention is concerned generally with novel chemical compounds and with processes of preparing the same. More particularly, it relates to the novel therapeutically effective compound N-(p-[(2-amino-4-hydroxypyrimido-[4,5 - b]pyrazin - 6 - ylmethyl) - formamido] - benzoyl)-glutamic acid, which may be chemically represented by the following structural formula:

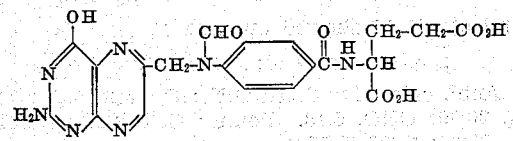

This novel compound, commonly called formyl folic acid, is useful for therapeutic treatment of patients with Addisonian pernicious anemia or with nutritional macrocytic anemia. The utility of N-(p-[(2-amino-4-hydroxypyrimido-[4,5 - b]pyrazin - 6 - ylmethyl) - amino] - benzoyl)-glutamic acid, commonly known as folic acid, in the treatment of some forms of anemia is well known but unfortunately many cases of anemia do not respond satisfactorily to this agent. It is believed that formyl folic acid functions biologically in the synthesis of purines by effecting the introduction of a one carbon unit into precursors and thereby forming the pyrimidine and purine nuclei. Apparently, folic acid cannot effect this biochemical reaction since it does not contain a carbon unit in available form. Our product, which contains such a carbon unit in available form as a formyl group, is useful in the treatment of pernicious anemia and nutritional macrocytic anemia in which the biochemical defect is the inability to carry out the step of mobilizing a formyl group by the enzyme system prior to the introduction of such a group into a purine precursor. The necessity for such a prior mobilization of the one carbon unit as a formyl group is shown by the fact that certain substances which antagonize the biological action of folic acid are many times less active in antagonizing the herein disclosed N - (p - [(2 - amino - 4 - hydroxypyrimido[4,5 - b]pyrazin - 6 - ylmethyl) - formamido] - benzoyl)-glutamic acid.

The medical differentiation of the various anemias is confusing and little understood and it is apparent that our novel product will be extremely useful in further differentiating the anemias. For example, some patients with pernicious anemia do develop spinal cord degeneration, whereas other patients do not. Many patients with pernicious anemia do not have free hydrochloric acid in their gastric contents. Patients with nutritional macrocytic anemia and sprue usually show the presence of free hydrochloric acid in their gastric contents. Some patients with nontropical sprue, macrocytic anemia and tropical sprue may never develop the same blood deficiency picture as other patients do. In some patients the characteristic diarrheas may precede for a long time the typical blood deficiency. It is clear that our product, formyl folic acid, can be specifically utilized in the treatment of certain anemias.

We have discovered that N-(p-[(2-amino-4-hydroxypyrimido[4,5 - b]pyrazin - 6 - ylmethyl)-formamido]-benzoyl)-glutamic acid can be prepared by reacting N-(p-[(2-amino-4-hydroxypyrimido[4,5 - b] - pyrazin - 6 - ylmethyl)-amino]-benzoyl)-glutamic acid with formic acid. It is very surprising that this reaction results in the production, in good yield, of the desired substance wherein a single formyl group is linked to the nitrogen atom coupled to the benzene ring. It would certainly be expected that formylation of the 2-amino group coupled to the pteridine nucleus would occur simultaneously. Other complications render successful production of the desired product impossible, such as cleavage of one or more of the linkages involved in the complicated molecular structure present, would also be expected.

In carrying out our invention we can use as starting material the crude, commercially available N - (p - [(2 - amino - 4 - hydroxypyrimido-[4,5 - b]pyrazin - 6 - ylmethyl) - amino] - benzoyl)-glutamic acid. In order to obtain our product in a pure condition it is ordinarily preferred, however, to purify the crude starting material. This purification is achieved by treating the crude commercial material with 15% hydrochloric acid, removing the least soluble fraction by filtration and fractionally precipitating the material in the filtrate by means of sodium acetate. The yellow-orange purified material is washed free of chloride ion with distilled water and then dried. The amount of fractionation required to effect purification depends, of course, on the quality of the original sample of commercially available material. A sample thus purified gave the following analysis.

Anal. calc'd for $C_{19}H_{19}O_6N_7$: C, 51.70; H, 4.34; N, 22.22. Found: C, 51.77; 4.78; N, 22.75; 22.79.

The reaction between the formic acid and the N - (p - [(2 - amino - 4 - hydroxypyrimido[4,5 - b]pyrazin - 6 - ylmethyl) - amino] - benzoyl) - glutamic acid is ordinarily carried out by heating the reactants together under reflux. The formic acid employed in this reaction should be relatively concentrated and we ordinarily utilize formic acid having a concentration of at least about 85%. We prefer, however, to use 98% formic acid or, if 85% formic acid is employed, to carry out the reaction in the presence of acetic anhydride. When 85% formic acid is employed alone the reaction is ordinarily complete in about 2 hours; when 98% formic acid, or 85% formic acid and acetic anhydride, is used the reaction is usually complete in 1 hour or less.

The reaction mixture is then evaporated to small volume and diluted with water thereby precipitating the crude formyl-folic acid produced by the reaction. This crude material is purified, if desired, by recrystallization from organic solvents; preferably by dissolving the crude formyl-folic acid in formic acid and adding to the solution a liquid which is miscible with formic acid and is a substantial non-solvent for formyl-folic acid as, for example, water, ether, and the like. N - (p - [(2 - amino - 4 - hydroxypyrimido[4,5 - b]pyrazin - 6 - ylmethyl) - formamido]-benzoyl)-glutamic acid, purified as described above, gave a satisfactory analysis and also possessed maximal folic acid type activity for growth stimulation of the microorganisms *Lactobacillus casei* and *Streptococcus faecalis R*.

The following examples illustrate methods of carrying out the present invention, but it is to be understood that these examples are given by way of illustration and not of limitation.

Example 1

Thirty-three milligrams of commercial folic acid, crude N - (p - [(2 - amino - 4 - hydroxypyrimido[4,5 - b]pyrazin - 6 - ylmethyl) - amino]-benzoyl)-glutamic acid, was dissolved in a mixture of 2 ml. of 85% formic acid and 0.5 ml. of acetic anhydride and heated at the reflux point for one hour. The solution was then evaporated to dryness in vacuo at 25° C. The residue was washed thoroughly with water and then dissolved in 85% formic acid. The solution was filtered and on slow dilution with water a yellow-orange crystalline precipitate of crude N-(p-[(2-amino - 4 - hydroxypyrimido[4,5 - b]pyrazin - 6-ylmethyl)-formamido]-benzoyl) glutamic acid formed. The crystalline compound was separated by centrifugation, washed thoroughly with water and dried.

The biological assay for *L. casei* showed 2600 units/mg. and for *S. faecalis R.* 2360 units/mg.

Example 2

Thirteen and six-tenths milligrams of N-(p-[(2 - amino - 4 - hydroxypyrimido[4,5 - b]-pyrazin - 6 - ylmethyl) - amino]-benzoyl) - glutamic acid was dissolved in 1 ml. of 85% formic acid and heated at 100° C. for 2 hours. The solution was slowly diluted with water and the dark precipitate (ca. 1 mg.) which first formed was separated and discarded. The mother liquor after further dilution with water gave a yellow-orange colored crystalline precipitate of crude N - (p - [(2 - amino - 4 - hydroxypyrimido[4,5 - b]pyrazin - 6 - ylmethyl) - formamido]-benzoyl)-glutamic acid. The ultra-violet absorption spectrum of this compound in aqueous solution at pH 11 showed maxima at 2550 Å. (E% 844) and 3660 Å. (E% 190).

Example 3

One gram of essentially pure N-(p-[(2-amino-4 - hydroxypyrimido[4,5 - b]-pyrazin - 6 - ylmethyl) -amino]-benzoyl)-glutamic acid dissolved in 60 ml. of 98% formic acid was refluxed for forty-five minutes. After cooling, the formic acid was evaporated until a 20-ml. volume remained. About 150 ml. of water was added to precipitate the crude acid. The tan-yellow product was collected by centrifugation and was washed first with a small amount of water, then with absolute ethanol and finally with ether. The weight of crude N-(p-[(2-amino-4-hydroxypyrimido[4,5 - b]pyrazin - 6 - ylmethyl) - formamido]-benzoyl)-glutamic acid was 0.67 g.

Purification was accomplished by dissolving in 98% formic acid, diluting with water, removing insoluble matter by filtration and removing water and formic acid by lyophilizing. This procedure was repeated and the material was then precipitated from aqueous formic acid solution with ether. From 0.1 g. of crude acid there was obtained 0.070 g. of essentially pure N-(p-[(2-amino - 4 - hydroxypyrimido[4,5 - b] - pyrazin - 6 - ylmethyl) - formamido] - benzoyl) - glutamic acid. The ultra-violet absorption spectrum of this compound in aqueous solution at pH 7 showed maxima at 2650 Å., $E_{1\%}^{1cm.}$ 550; 3500 Å., $E_{1\%}^{1cm.}$ 148 and at pH 11 showed maxima at

2550 Å., $E_{1\%}^{1cm.}$ 910; 3660 Å., $E_{1\%}^{1cm.}$ 187

Anal. calc'd for $C_{20}H_{19}O_7N_7$: C, 51.17; H, 4.08; N, 20.89; CHO, 6.18. Found: C, 51.24; H, 4.21; N, 20.36; CHO, 5.77.

Various changes and modifications may be made in carrying out the present invention without departing from the spirit and scope thereof. Insofar as these changes and modifications are within the purview of the annexed claims, they are to be considered as part of our invention.

We claim:

1. N - (p - [(2 - amino - 4 - hydroxypyrimido[4,5 - b]pyrazin - 6 - ylmethyl) - formamido] - benzoyl)-glutamic acid, having the formula:

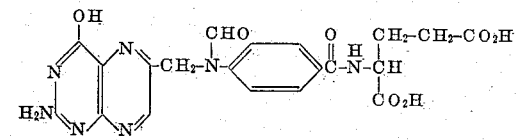

2. The process of preparing N-(p-[(2-amino-4 - hydroxypyrimido[4,5 - b]pyrazin - 6 - ylmethyl) - formamido] - benzoyl) - glutamic acid which comprises reacting N-(p-[(2-amino-4 - hydroxypyrimido[4,5 - b]pyrazin - 6 - ylmethyl)-amino]-benzoyl)-glutamic acid with formic acid, and recovering said N-(p-[(2-amino - 4 - hydroxypyrimido[4,5 - b]pyrazin - 6 - ylmethyl)-formamido]-benzoyl)-glutamic acid from the reaction mixture.

3. The process of preparing N-(p-[(2-amino-4 - hydroxypyrimido[4,5 - b]pyrazin - 6 - ylmethyl) - formamido] - benzoyl) - glutamic acid which comprises reacting N-(p-[(2-amino-4-hydroxypyrimido[4,5 - b]pyrazin - 6 - ylmethyl)-amino]-benzoyl)-glutamic acid with formic acid having a concentration of at least about 98%, and recovering said N-(p-[(2-amino-4-hydroxypyrimido[4,5 - b]pyrazin - 6 - ylmethyl) - formamido] - benzoyl) - glutamic acid from the reaction mixture.

4. The process of preparing N-(p-[(2-amino-4 - hydroxypyrimido[4,5 - b]pyrazin - 6 - ylmethyl) - formamido] - benzoyl) - glutamic acid which comprises reacting N-(p-[(2-amino-4-hydroxypyrimido[4,5 - b]pyrazin - 6 - ylmethyl)-amino]-benzoyl)-glutamic acid with formic acid and acetic anhydride, and recovering said N - (p - [(2 - amino - 4 - hydroxypyrimido[4,5 - b]pyrazin - 6 - ylmethyl) - formamido] - benzoyl)-glutamic acid from the reaction mixture.

EDWARD A. KACZKA.
KARL FOLKERS.

REFERENCES CITED

The following references are of record in the file of this patent:

Spies et al., Blood, 3, 121–126 (Jan. 1948).
Wolf et al., J. Am. Chem. Soc., 69, 2753–2759 (1947).
Angier et al., Science, 103, 667–669 (1946).